(12) United States Patent
Brightwell et al.

(10) Patent No.: US 8,566,536 B1
(45) Date of Patent: Oct. 22, 2013

(54) DIRECT ACCESS INTER-PROCESS SHARED MEMORY

(75) Inventors: Ronald B. Brightwell, Albuquerque, NM (US); Kevin Pedretti, Albuquerque, NM (US); Trammell B. Hudson, Washington, DC (US)

(73) Assignee: Sandia Corporation, Albuquerque, NM (US)

(*) Notice: Subject to any disclaimer, the term of this patent is extended or adjusted under 35 U.S.C. 154(b) by 1012 days.

(21) Appl. No.: 12/551,666

(22) Filed: Sep. 1, 2009

Related U.S. Application Data

(60) Provisional application No. 61/160,950, filed on Mar. 17, 2009.

(51) Int. Cl.
G06F 12/00 (2006.01)
(52) U.S. Cl.
USPC .................. 711/147; 711/205; 711/E12.014
(58) Field of Classification Search
None
See application file for complete search history.

(56) References Cited

U.S. PATENT DOCUMENTS 7,647,471 B2 * 1/2010 Hastings et al. ............... 711/209

OTHER PUBLICATIONS

Feind, Karl et al., "An Ultrahigh Performance MPI Implementation on SGI® ccNUMA Altix® Systems", Computational Methods in Science and Technology, Special Issue 2006, pp. 67-70.

Buntinas, Darius et al., Implementation and Shared-Memory Evaluation of MPICH2 over the Nemesis Communication Subsystem', Lecture Notes in Computer Science: Recent Advances in Parallel Virtual Machine and Message Passing Interface, 2006, pp. 86-95, Springer Berlin.
Buntinas, Darius et al., "Data Transfers between Processes in an SMP System: Performance Study and Application to MPI", Proceedings of the 35$^{th}$ International Conference on Parallel Processing 2006 (ICPP-2006), Aug. 2006, 8 pages.
Buntinas, Darius et al , "Cache-Efficient, Intranode, Large-Message MPI Communication with MPICH2-Nemesis", Proceedings of the 38$^{th}$ International Conference on Parallel Processing 2009 (ICPP-2009), Version 1, Jun. 5, 2009, 9 pages.
Buntinas, Darius et al., "Implementation and Evaluation of Shared-Memory Communication and Synchronization Operations in MPICH2 using the Nemesis Communications Subsystem", Preprint submitted to Parallel Computing, Jun. 8, 2007, 17 pages.
Chai, Lei et al., "Designing an Efficient Kernel-level and User-level Hybrid Approach for MPI Intra-node Communication on Multi-core Systems", Proceedings of the 38$^{th}$ International Conference on Parallel Processing 2008 (ICPP-2008), Sep. 2008, 8 pages.

(Continued)

*Primary Examiner* — Reginald Bragdon
*Assistant Examiner* — Baboucarr Faal
(74) *Attorney, Agent, or Firm* — Cory G. Claassen; Gregory M. Doudinkoff

(57) ABSTRACT

A technique for directly sharing physical memory between processes executing on processor cores is described. The technique includes loading a plurality of processes into the physical memory for execution on a corresponding plurality of processor cores sharing the physical memory. An address space is mapped to each of the processes by populating a first entry in a top level virtual address table for each of the processes. The address space of each of the processes is cross-mapped into each of the processes by populating one or more subsequent entries of the top level virtual address table with the first entry in the top level virtual address table from other processes.

20 Claims, 7 Drawing Sheets

(56) References Cited

OTHER PUBLICATIONS

Jin, Hyun-Wook et al., "LiMIC: Support for High-Performance MPI Intra-Node Communication on Linux Cluster", Proceedings of the 34$^{th}$ International Conference on Parallel Processing 2005 (ICCP-2005), Jun. 2005, 8 pages.

Druschel, Peter et al., "Fbufs: A High-Bandwidth Cross-Domain Transfer Facility", Proceedings of the Fourteenth ACM symposium on Operating Systems Principles, 1993, pp. 189-202.

Woodacre, Michael et al., "The SGI® Altix™ 3000 Global Shaed-Memory Architecture", White Paper, 2003, 11 pages, Silicon Graphics, Inc., Silicon, CA.

* cited by examiner

DIRECT ACCESS INTER-PROCESS SHARED MEMORY

CROSS REFERENCE TO RELATED APPLICATION

This application claims the benefit of U.S. Provisional Application No. 61/160,950 tiled on Mar. 17, 2009, the contents of which are incorporated herein by reference.

STATEMENT REGARDING FEDERALLY SPONSORED RESEARCH

This invention was developed with Government support under Contract No. DE-AC04-94AL850(X) between Sandia Corporation and the U.S. Department of Energy. The U.S. Government has certain rights in this invention.

TECHNICAL FIELD

This disclosure relates generally to memory sharing, and in particular but not exclusively, relates to inter-process memory sharing.

BACKGROUND INFORMATION

As the core count on processors used for high-performance computing continues to increase, the performance of the underlying memory subsystem becomes more important. In order to make effective use of the available compute power, applications will likely have to become more sensitive to the way in which they access memory. Applications that are memory bandwidth bound should avoid extraneous memory-to-memory copies. For many applications, the memory bandwidth limitation is compounded by the fact that the most popular and effective parallel programming model, Message Passing Interface ("MPI"), mandates copying of data between processes. MPI implementers have worked to make use of shared memory for communication between processes on the same node. Unfortunately, the current schemes for using shared memory for MN can require either excessive memory-to-memory copies or potentially large overheads inflicted by the operating system ("OS").

In order to avoid the memory copy overhead of MPI altogether, more and more applications are exploring mixed-mode programming models where threads and/or compiler directives are used on-node and MPI is used off-node. The complexity of shared memory programming using threads has hindered both the development of applications as well as the development of thread-safe and thread-aware MN implementations. The initial attractiveness of mixed-mode programming was tempered by the additional complexity induced by finding multi-level parallelism and by initial disappointing performance results.

Portable Operating System Interface ("POSIX") based operating systems generally support shared memory capability through two fundamental mechanisms: threads and memory mapping. Unlike processes, which allow for a single execution context inside an address space, threads allow for multiple execution contexts inside a single address space (note, a "process" is defined here as the combination of an execution context plus an address space). When one thread updates a memory location, all of the threads sharing the same address space also see the update. A major drawback of threads is that great care must be taken to ensure that common library routines are reentrant, meaning that multiple threads could be executing the same library routine simultaneously. For non-reentrant functions, some form of locking is used to ensure atomic execution. The same is true for data accessed by multiple threads—updates are atomic with respect to one another or else difficult to debug race conditions may occur. Race conditions and fundamentally non-deterministic behavior make threads difficult to use correctly.

In memory mapping, cooperating processes request a shared region of memory from the OS and then map it into their private address space, possibly at a different virtual address in each process. Once initialized, a process may access the shared memory region in exactly the same way as any other memory in its private address space. As with threads, updates to shared data structures in this region are atomic.

Explicit message passing is an alternative to shared memory for intra-node data sharing. In message passing, processes pass messages carrying data between one another. No data is shared directly, but rather is copied between processes on an as necessary basis. This eliminates the need for re-entrant coding practices and careful updates of shared data, since no data is shared. The main downside to this approach is the extra overhead involved in copying data between processes.

In order to accelerate message passing, memory mapping is often used as a high-performance mechanism for moving messages between processes. Unfortunately, such approaches to using page remapping are not sufficient to support MPI semantics, and general-purpose operating systems lack the appropriate mechanisms. The sender must copy the message into a shared memory region and the receiver must copy it out—a minimum of two copies must occur.

As of MPI 2.0, MPI applications may make use of both threads and memory mapping, although few MPI implementations provide full support for threads. More commonly, MPI implementations utilize memory mapping internally to provide efficient intra-node communication. During MPI initialization, the processes on a node elect one process to create the shared memory region and then the elected process broadcasts the information about the region to the other processes on the node (e.g., via a file or the sockets API). The other processes on the node then "attach" to the shared memory region, by requesting that the OS map it into their respective address spaces.

Note that the approach of using shared memory for intra-node MPI messages only works for the point-to-point operations, collective communication operations, and a subset of the MPI-2 remote memory access operations. Copying mandates active participation of the two processes involved in the transfer. Single-sided put/get operations, such as those in the Cray Shared Memory ("SHMEM") programming interface, cannot be implemented using POSIX shared memory.

There are several limitations in using regions of shared memory to support intra-node MPI. First, the MPI model doesn't allow applications to allocate memory out of this special shared region, so messages must first be copied into shared memory by the sender and then copied out of the shared region by the receiver. This copy overhead can be a significant performance issue. Typically there is a limitation on the amount of shared memory that a process can allocate, so the MPI implementation must make decisions about how to most effectively use this memory in terms of how many per process messages to support relative to the size of the contents of each message. The overhead of copying messages using shared memory has led researchers to explore alternative single-copy strategies for intra-node MPI message passing.

One such strategy is to use the OS to perform the copy between separate address spaces. In this method, the kernel maps the user buffer into kernel space and does a single memory copy between user space and kernel space. The drawback of this approach is that the overhead of trapping to the kernel and manipulating memory maps can be expensive. Another limitation is that all transfers are serialized through the operating system. As the number of cores on a node increases, serialization and management of shared kernel data structures for mapping is likely to be a significant performance limitation. Another important drawback of this approach is that there are two MPI receive queues—one in the MPI library and one in the kernel. When the application posts a non-specific receive using MPI_ANY_SOURCE, great care is taken to insure that the atomicity and ordering semantics of MPI are preserved. There is a potential race for a non-specific receive request to be satisfied by both the MPI library and the operating system. Managing atomicity between events in kernel space and user space is non-trivial.

Another strategy for optimizing intra-node transfers is to use hardware assistance beyond the host processors. The most common approach is to use an intelligent, programmable, network interface to perform the transfer. Rather than sending a local message out to the network and back, the network interface can simply use its direct memory access ("DMA") engines to do a single copy between the communicating processes. The major drawback of this approach is serialization through the network interface, which is typically much slower than the host processor(s). Also, large coherent shared memory machines typically have hardware support for creating a global shared memory environment. This hardware can also be used when running distributed memory programs to map arbitrary regions of memory to provide direct shared memory access between processes. The obvious drawback of this approach is the additional cost of this hardware.

More recently, a two-level protocol approach for intra-node communication uses shared memory regions for small messages and OS support for page remapping individual buffers for large messages has been proposed. There has also been some recent work on optimizing MPI collective operations using shared memory for multi-core systems.

All communication between processes on the Cray XT use the Portals data movement layer. Two implementations of Portals are available. The default implementation is interrupt driven and all Portals data structures are contained inside the operating system. When a message arrives at the network interface of the Cray XT, the network interface interrupts the host processor, which then inspects the message header, traverses the Portals data structures and programs the DMA engines on the network interface to deliver the message to the appropriate location in the application process' memory. This implementation is referred to as Generic Portals ("GP") because it works for both Catamount on compute nodes and in Linux on service and I/O nodes. The other implementation supports a complete offload of Portals processes and uses no interrupts. When a message arrives at the network interface, all of the Portals processing occurs on the network interface itself. This implementation is known as Accelerated Portals ("AP") and is available only on Catamount, largely due to the simplified address translation that Catamount offers.

For intra-node transfers, the Generic Portals implementation takes advantage of the fact that Portals structures for both the source and destination are in kernel space. The kernel is able to traverse the structures and perform a single memory copy to move data between processes, since all of user space is also mapped into kernel space. At large message sizes, it becomes more efficient for the kernel to use the DMA engines on the network interface to perform the copy, so there is a crossover point where it switches to using this approach. For the Accelerated Portals implementation, all Portals data structures are in network interface memory, so it must traverse these structures in the same way it does for incoming network messages, so there is little advantage to intra-node transfers. In fact, intra-node transfers are slower going through the network interface rather than the operating system, due to the higher speed of the host processor relative to the network processor.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system and method for direct sharing of physical memory between processes executing on separate processor cores are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
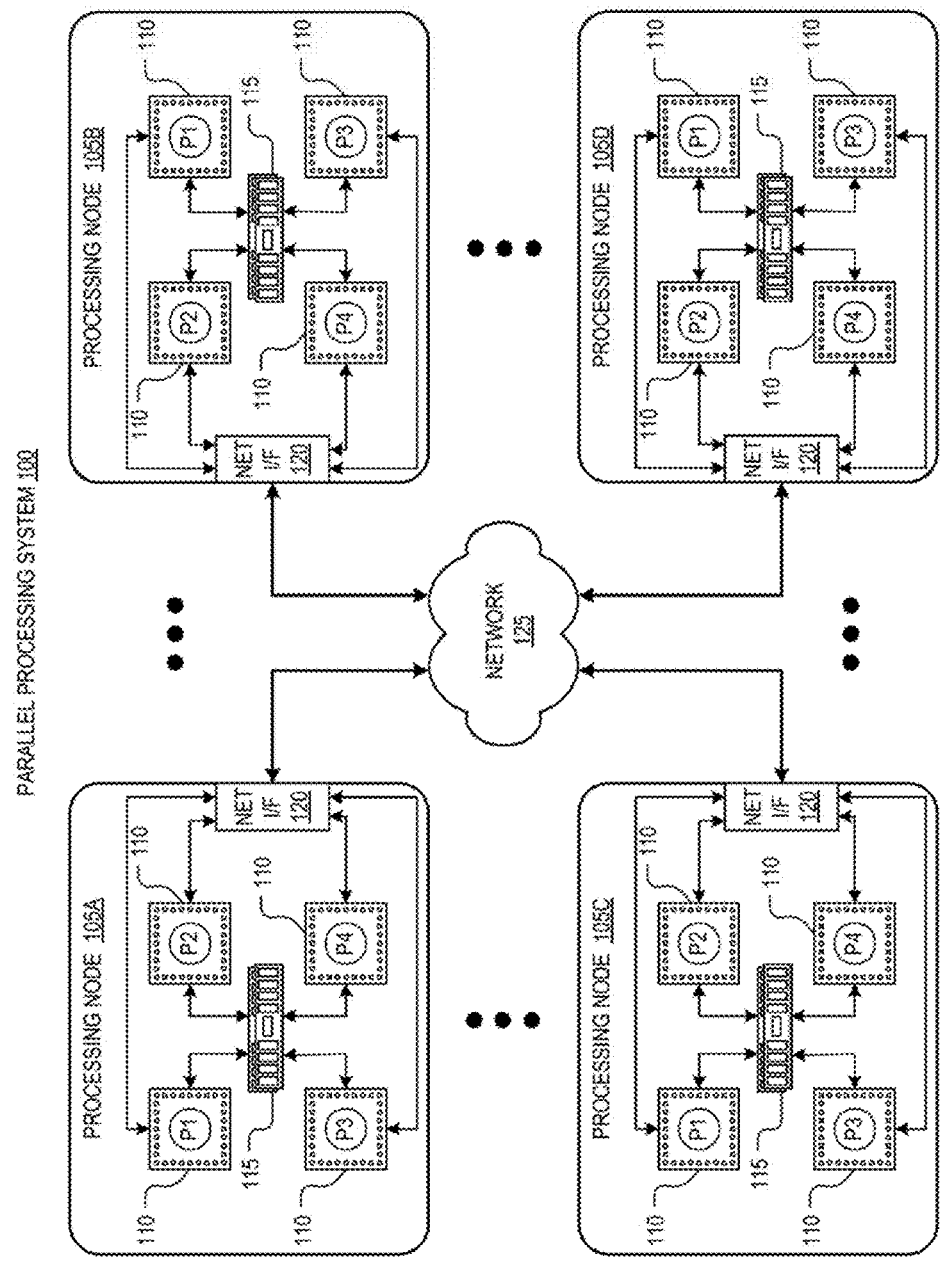
FIG. 1 is a functional block diagram illustrating a parallel processing system for executing a parallel processing job, in accordance with an embodiment of the invention.

FIG. 1 is a functional block diagram illustrating a parallel processing system 100 for executing a parallel processing job, in accordance with an embodiment of the invention. The illustrated embodiment of parallel processing system 100 includes processing nodes 105A-D (collectively 105) interconnected by a network 125. The illustrated embodiment of each processing node 105 includes four processors 110, physical memory 115, and a network interface 120 for coupling to network 125. Although FIG. 1 illustrates four processing nodes 105 each including four processors 110, it should be appreciated that embodiments of the invention may operate within parallel processing systems having more or less interconnected processing nodes (e.g., hundreds or thousands of interconnected processing nodes) with each node including more or less processors. In one embodiment, network 125 may represent a local area network ("LAN"), a wide area network ("WAN"), a metro area network ("MAN"), the Internet, or otherwise.

When executing a parallel processing job within parallel processing system 100, each processor 110 is assigned one or more portions of the parallel processing job. Collectively, processing nodes 105 work together to achieve/solve a common problem. By breaking the parallel processing job into a collection of smaller jobs, which are assigned to individual processing nodes, a complex and time consuming problem can be solved more quickly than if a single processor were to attempt the same problem. In one embodiment, parallel processing system 100 is a Computer Cluster or Massively Parallel Computer for performing parallel computing.

Figure 2:
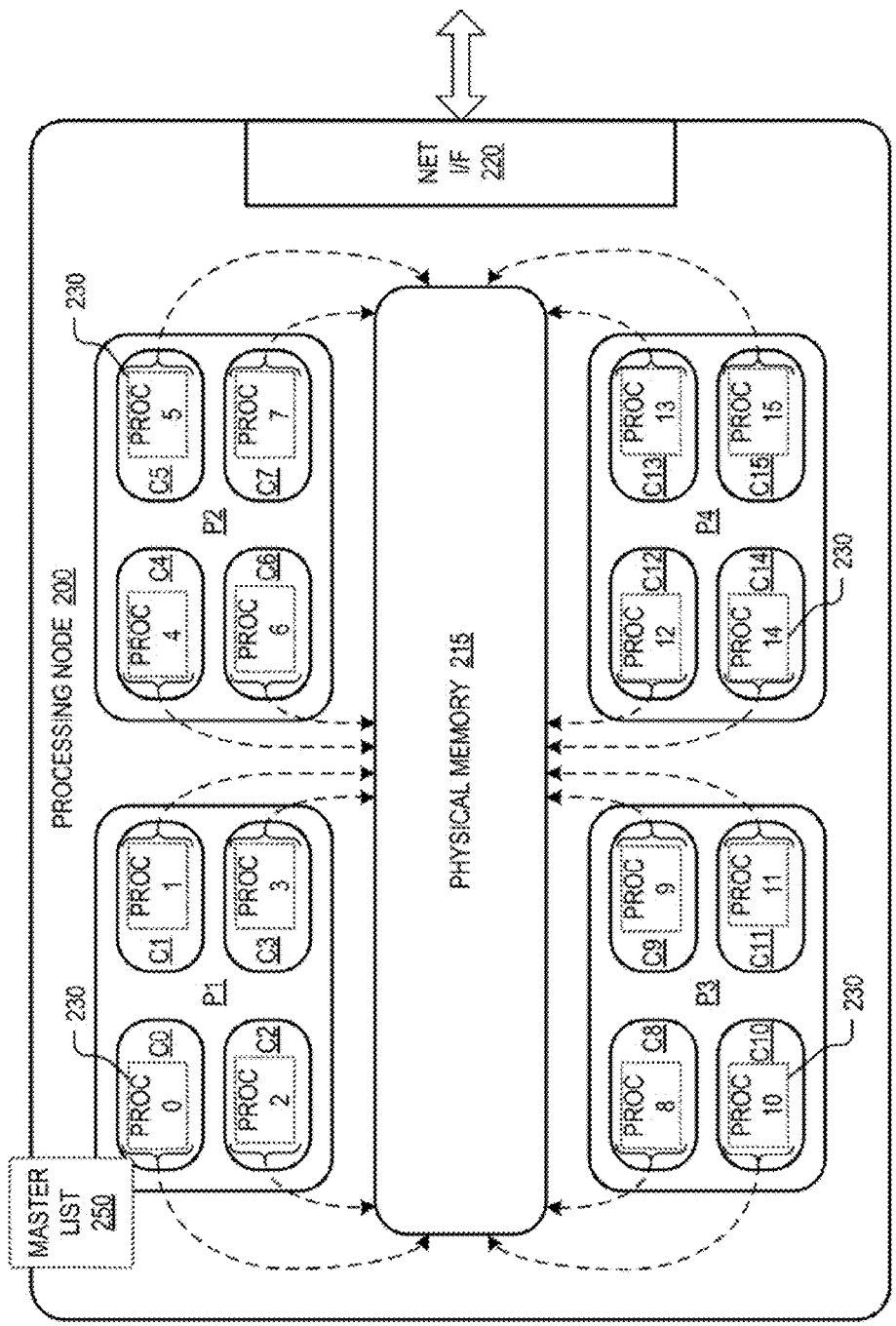
FIG. 2 is a functional block diagram illustrating a processing node for executing processes of a parallel processing job, in accordance with an embodiment of the invention.

FIG. 2 is a functional block diagram illustrating a processing node 200 for executing processes of a parallel processing job, in accordance with an embodiment of the invention. The illustrated embodiment of processing node 200 is one possible implementation of processing nodes 105. The illustrated embodiment of processing node 200 includes processors P1-P4, physical memory 215, and a network interface 220. The illustrated embodiments of each processor P1-P4 each include four processor cores (e.g., cores C0-C3, C4-C7, C8-C11, or C12-C15). Accordingly, in the illustrated embodiment, each processor is a quad-core processor. However, it should be appreciated that other embodiments may include single core, dual core, or N core processors, where N is a positive integer.

Each processor core is coupled to and shares physical memory 215. During operation, each processor core is loaded with a separate instance of a process 230 (only a portion of which are labeled so as not to clutter the drawing), which when collectively executed form a parallel processing job. In one embodiment, a primary core (e.g., processor core C0) also executes a primary kernel process, while the remaining processor cores within processing node 200 execute secondary kernel processes from time-to-time. When initially launching a new parallel processing job, the primary kernel may launch the individual processes 230 on each processor core and assign each of them a local address space mapped to a respective portion of physical memory 215. Embodiments of the invention enable the local address space of each process 230 to be cross mapped into each of the other processes' address spaces to provide a direct access, shared memory paradigm (described in detail below).

In one embodiment, the address space mapping is a static, linear mapping to physical memory 215 where a virtual address is associated with a physical address within physical memory 215 and does not change during execution of a given process. In these static, linear mapping embodiments, demand-paged virtual memory is not supported. Static, linear mapping of virtual addresses can alleviate the need to register memory or "lock" memory pages involved in network transfers to prevent the operating system from unmapping or re-mapping pages mid-stream of the transfer. The mapping may be executed at process creation time and subsequently left unchanged. This type of static mapping for the life of a process can simplify translation and validation of virtual addresses. Virtual address validation can be implemented with a quick bounds check and translating virtual addresses to physical addresses can be implemented with a quick offset calculation. In an alternative embodiment, the address space mapping is dynamic and supports demand-paging.

Figure 3:
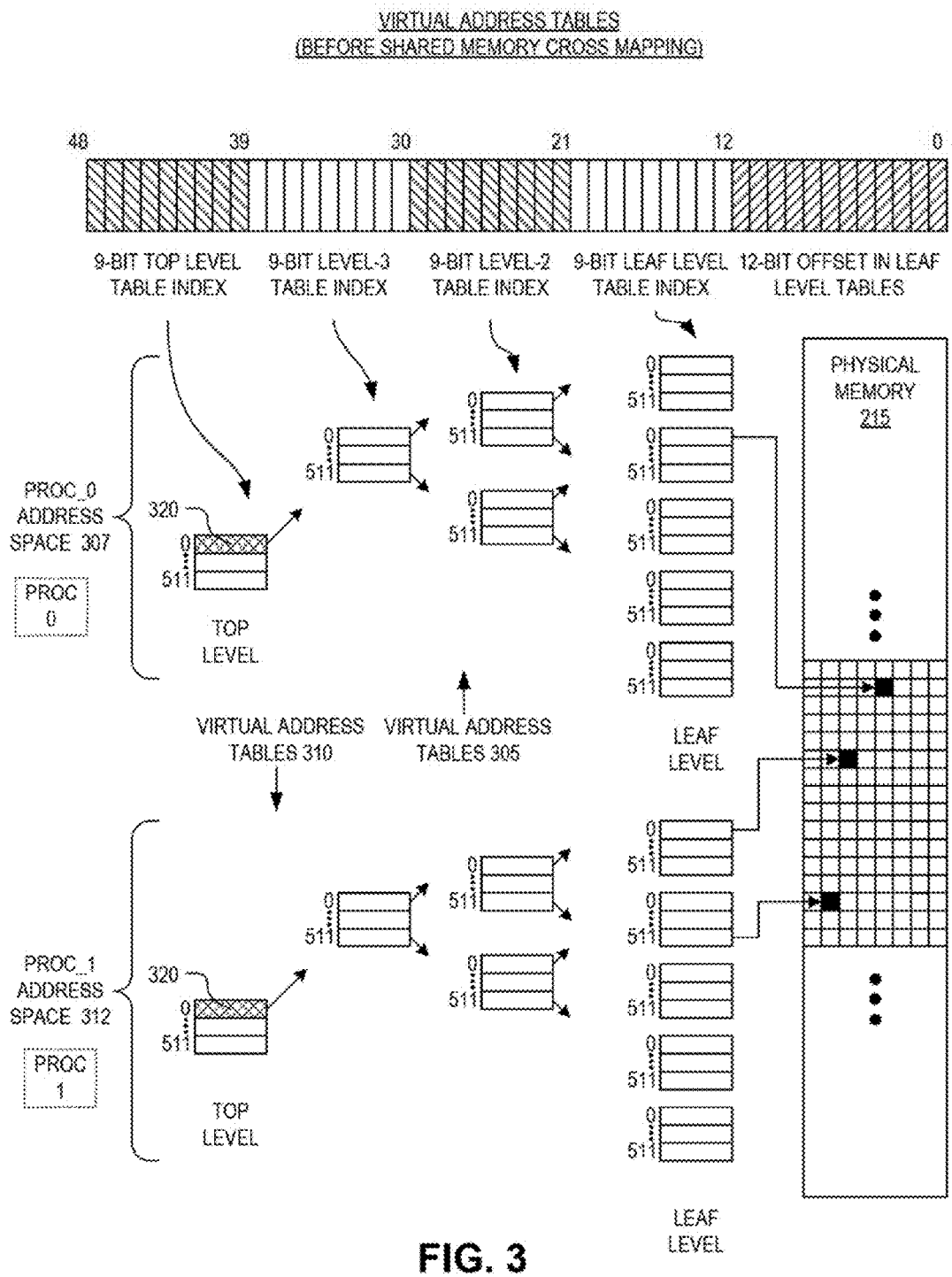
FIG. 3 illustrates virtual address tables mapping two address spaces of two processes executing on separate processor cores, in accordance with an embodiment of the invention.

FIG. 3 illustrates virtual address tables mapping the local address spaces of two processes executing on separate processor cores prior to shared memory cross-mapping, in accordance with an embodiment of the invention. FIG. 3 illustrates virtual address tables 305 mapping an address space 307 of process PROC 0 and virtual address tables 310 mapping an address space 312 of process PROC 1.

In the illustrated embodiment, the address space of each processes 230 is defined by a 48-bit address space mapped using four levels of virtual address tables: level-1 (leaf level), level-2, level-3, and level-4 (top level). In one embodiment, the address spaces are defined using the X86 64-bit page table structure with the four levels of address tables corresponding to the page tables (level-1), page directories (level-2), page directory pointer table (level-3), and the page-map level-4 table (level-4). It should be appreciated that embodiments of the invention may be implemented in connection with other virtual address table structures defined by more or less bits and mapped using more or less levels of address tables.

The address space mapped to a given process is referred to herein as addressing the "local" memory within physical memory 215 of that given process, while the address space mapped to another process is referred to herein as addressing "remote" memory within physical memory 215 relative to the given process. The terms "local" and "remote" are not intended to connote a remote physical location, but rather the logical association of one address space relative to a given process. For example, address space 307 is local to process PROC 0, while address space 312 is remote to process PROC 0. Correspondingly, address space 312 is local to process PROC 1, while address space 307 is remote to process PROC 1.

Figure 4:
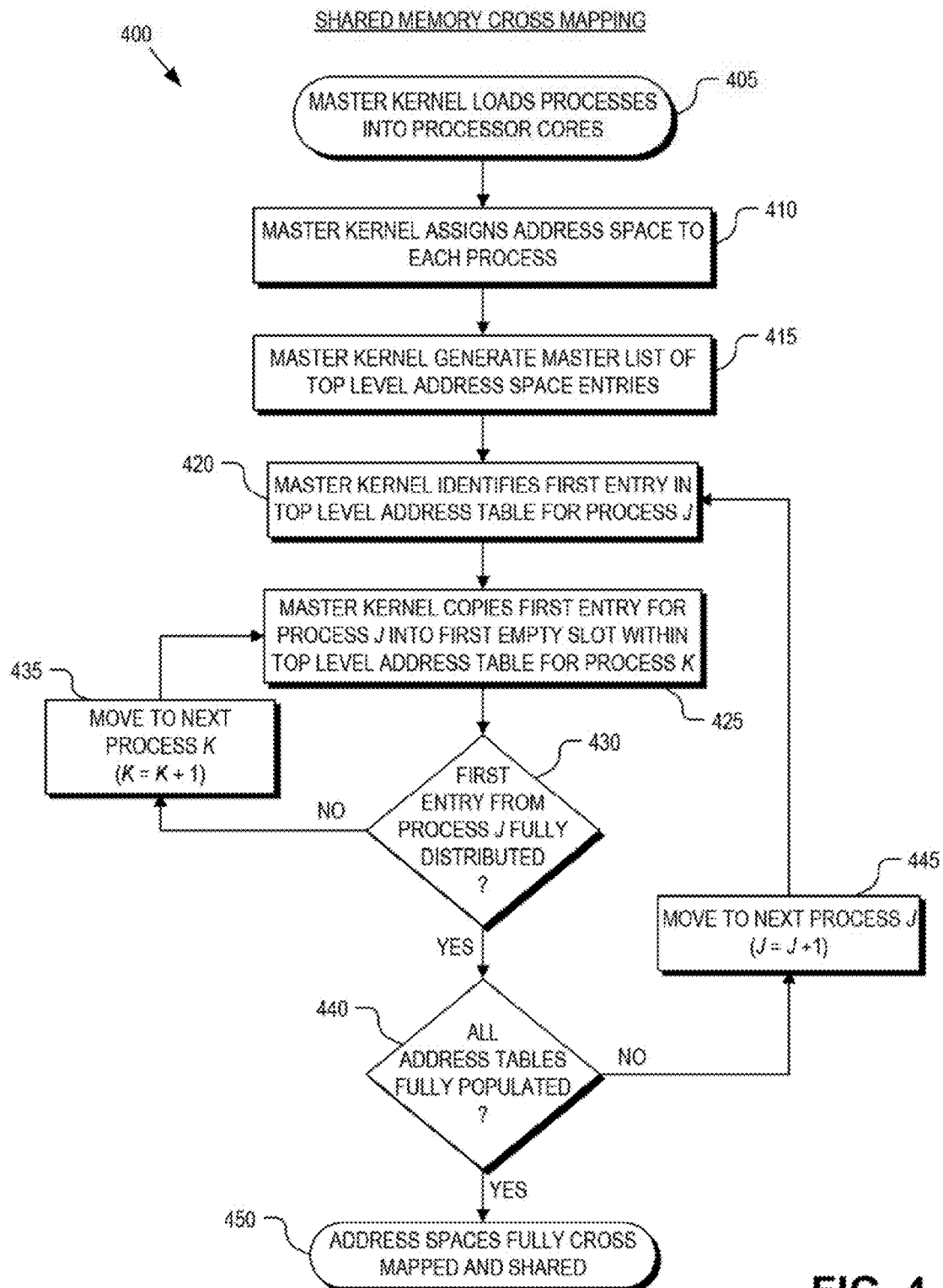
FIG. 4 is a flow chart illustrating a method for sharing physical memory between processes executing on separate processor cores, in accordance with an embodiment of the invention.

FIG. 4 is a flow chart illustrating a method 400 for sharing physical memory 215 between processes executing on separate processor cores within a single processing node, in accordance with an embodiment of the invention. The order in which some or all of the blocks appear in method 400 should not be deemed limiting. Rather, one of ordinary skill in the art having the benefit of the present disclosure will understand that some of the blocks may be executed in a variety of orders not illustrated.

In a block 405, a master kernel executing on processor core C0 (the primary core) commences loading a process into each processor core of processing node 200. Although FIG. 2 illustrates processor core C0 as executing the master kernel, it should be appreciated that one or more kernels or master kernels may execute on any of the processor cores C0-C15. The processes may be downloaded over network interface 220, loaded from non-volatile memory (not illustrated), or otherwise. As each process is loaded into a processor core, the master kernel maps an address space (e.g., address space 307 or 312) and associated virtual address tables to the process (block 410). As each address space is being created and mapped to a given process, the master kernel commences generation of a master list 250 (see FIG. 2) of the first entry 320 (see FIG. 3) in the top level virtual address table of each address space for each process. First entry 320 is a reference or pointer to the lower level virtual address tables of each address space. First entry 320 may be thought of as the gateway pointer to the local address space of its associated process. First entry 320 is initially the only entry populated into the top level virtual address table of a given address space. In an alternative embodiment, the processes (e.g. PROC 0 through 15) can set themselves up and individual cross-map their address spaces (e.g., via API calls to cross-register their local address spaces).

Although FIG. 2 illustrates that the local address space is represented by a single first entry 320, it should be appreciated that a local address space may be represented using multiple entries 320. Of course, using multiple entries 320 per local address space reduces the number of remote address spaces that could be shared across processor cores.

Once two or more local address spaces have been mapped or established, cross-mapping local address spaces can commence. The master kernel identifies the first entry 320 in the top level virtual address table of a process J (block 420) and copies that first entry 320 for the process J into the first empty slot within the top level virtual address table for a process K (block 425). The master kernel continues copying the first entry 320 from process J into the first empty slot of the other address spaces for the other processes K until that particular first entry 320 has been populated into all other address spaces (decision block 430 & block 435). In one embodiment, first entry 320 is retrieved from master list 250 as opposed to directly retrieved from each top level virtual address table.

In one embodiment, once a given first entry 320 is fully distributed, master kernel moves to the next process (block 445) and distributes its first entry 320 to all the other processes. Finally, once the first entry of the top level virtual address table for all process have been cross populated into subsequent entries of all other top level virtual address tables (decision block 440), cross-mapping is complete and the address spaces of all processes within processing node 200 are shared.

As mentioned above, in some embodiments, from time-to-time a master kernel operates on a primary core (e.g., processor core C0), while secondary kernels operate on the remaining processor cores (secondary cores). During operation, a given secondary core may trap to a given secondary kernel in response to an interrupt (e.g., network transaction requests or otherwise). Upon trapping to the secondary kernel, the execution context of the given secondary core may switch to a new execution context having a new address space. In some embodiments, the secondary kernel may launch an inter-process trap handler to interrupt the primary core. In response, the primary kernel on the primary core updates master list 250 with a new entry pointing to the new address space as well as propagates the new entry to the top level virtual address tables of the other processes to reflect the new remote address space associated with the new execution context on the given secondary core.

Figure 5:
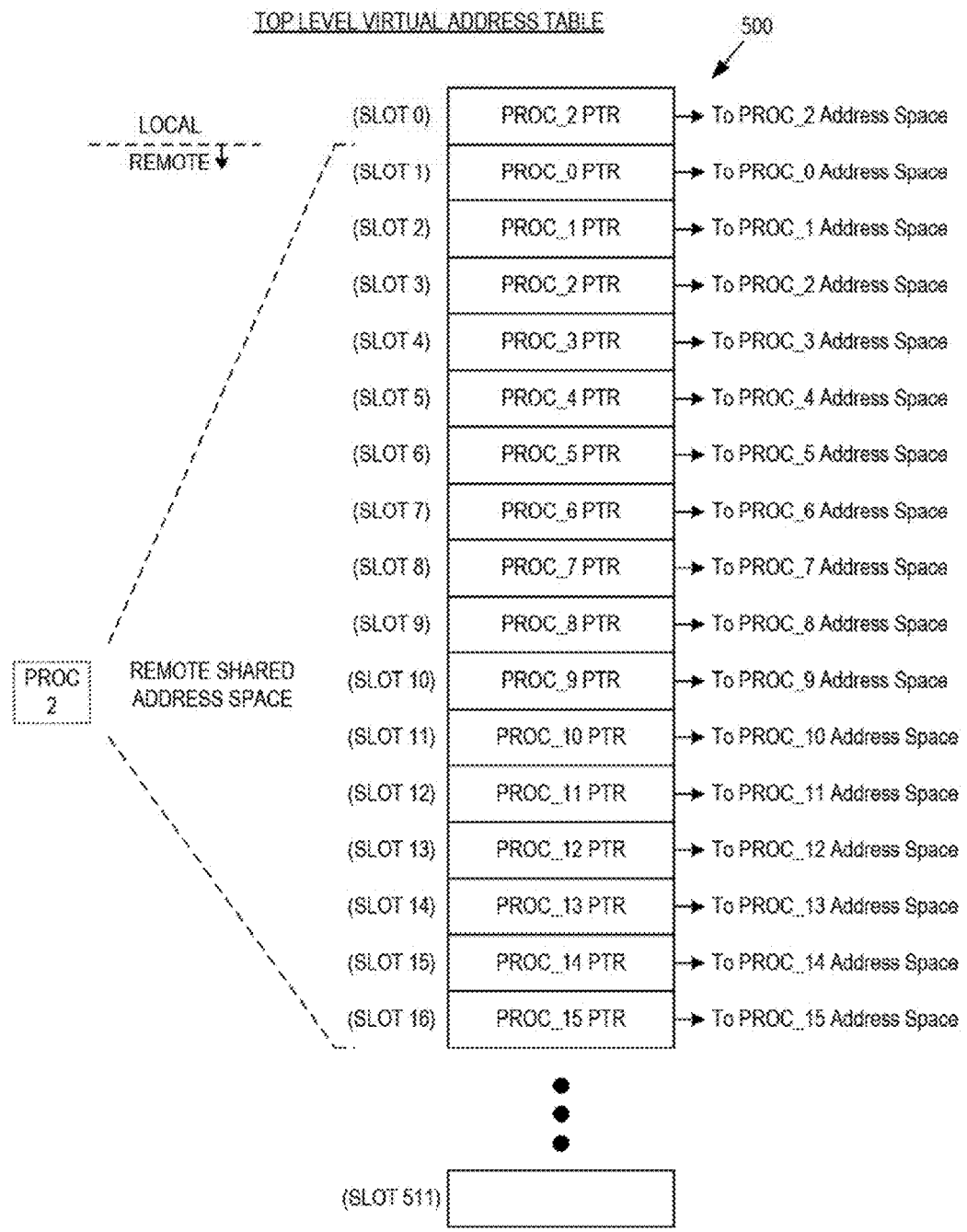
FIG. 5 is a diagram illustrating a top level virtual address table of a process cross-mapped to remote address spaces of other processes, in accordance with an embodiment of the invention.

FIG. 5 is a diagram illustrating a top level virtual address table 500 of process PROC 2 cross-mapped to remote address spaces of other processes, in accordance with an embodiment of the invention. Prior to cross-mapping, slot 0 (storing first entry 320 for PROC 2's address space) was populated with the pointer or reference to the local address space of process PROC 2. During the cross-mapping, as executed in method 400 illustrated in FIG. 4, the subsequent empty slots (slots 1 thru 16) are populated with the first entry (slot 0) from the other top level virtual address tables associated with the address spaces of the other processes. For example, slot 1 is populated with first entry 320 of the top level virtual address table from address space 307 (associated with process PROC 0), slot 2 is populated with first entry 320 of the top level virtual address table from address space 312 (associated with process PROC 1), and so on until the local address space of each process is mapped into top level virtual address table 500 of process PROC 2 as a remote address space. In the illustrated embodiment, the pointer PROC_2 PTR of process PROC 2 is replicated again within top level virtual address table 500 at slot 3. This may be done to simplify access to the remote address spaces to a quick offset calculation: SLOT #=(PROC #)+1. If there is a one-to-one correspondence of processes to processor cores, then the offset calculation could also read: SLOT #=(CORE #)+1. Once fully cross-mapped, process PROC 2 can directly and unilaterally access the address spaces of any of the other processes 230 with a single read/write memory operation.

Figure 6:
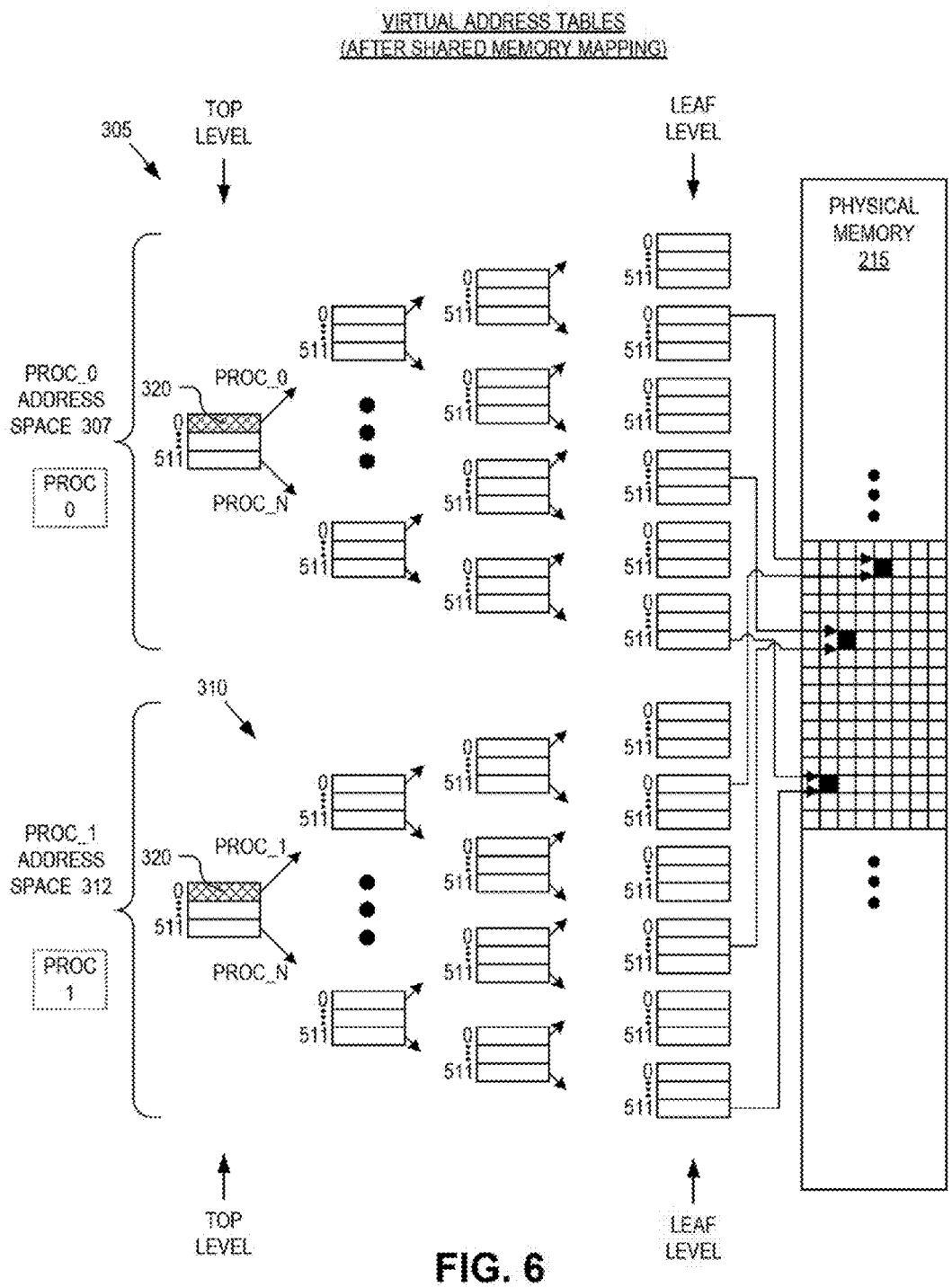
FIG. 6 illustrates virtual address tables of two processes populated with entries to cross-map the address spaces of a plurality of processes to directly share physical memory, in accordance with an embodiment of the invention.

FIG. 6 illustrates virtual address tables 305 and 310 populated with entries to cross-map the address spaces of the plurality of processes to directly share physical memory 215, in accordance with an embodiment of the invention. As illustrated in FIG. 6, the top level virtual address tables for both processes PROC 0 and PROC 1 now each include multiple entries linking to lower level virtual address tables of remote address spaces of other processes. In the example of a 9-bit top level table index, up to 511 ($2^9$ less one for the local address space of the given process) remote address spaces may be cross mapped into the address space of each process. In some embodiments, an additional slot within the top level address table may also be reserved for execution of a kernel.

Conventional architectures maintain a unique set of address translation structures (e.g., a page table tree) for each process and a single set for each group of threads. In contrast, embodiments of the invention operate differently in that a process' address space and associated address translation structure (e.g., virtual address tables 305 or 310) are neither fully unique nor fully shared. For example, in one embodiment, a unique top level address table is maintained for each process; however, all processes share a common set of leaf level address tables linked from the top level address tables. In contrast, Linux memory management does not support this form of leaf level address table sharing, so each process is given a replicated copy of each shareable leaf level address table.

In one embodiment where each process is an instance of a parallel processing job, the local mapping of virtual addresses is identical across all process instances executing on all processor cores and processing nodes. The starting address of the data, stack, and heap is the same. This means that the local virtual address of variables with global scope is identical everywhere, though access to a remote variable by a remote process uses a top level offset plus the local virtual address.

Figure 7:
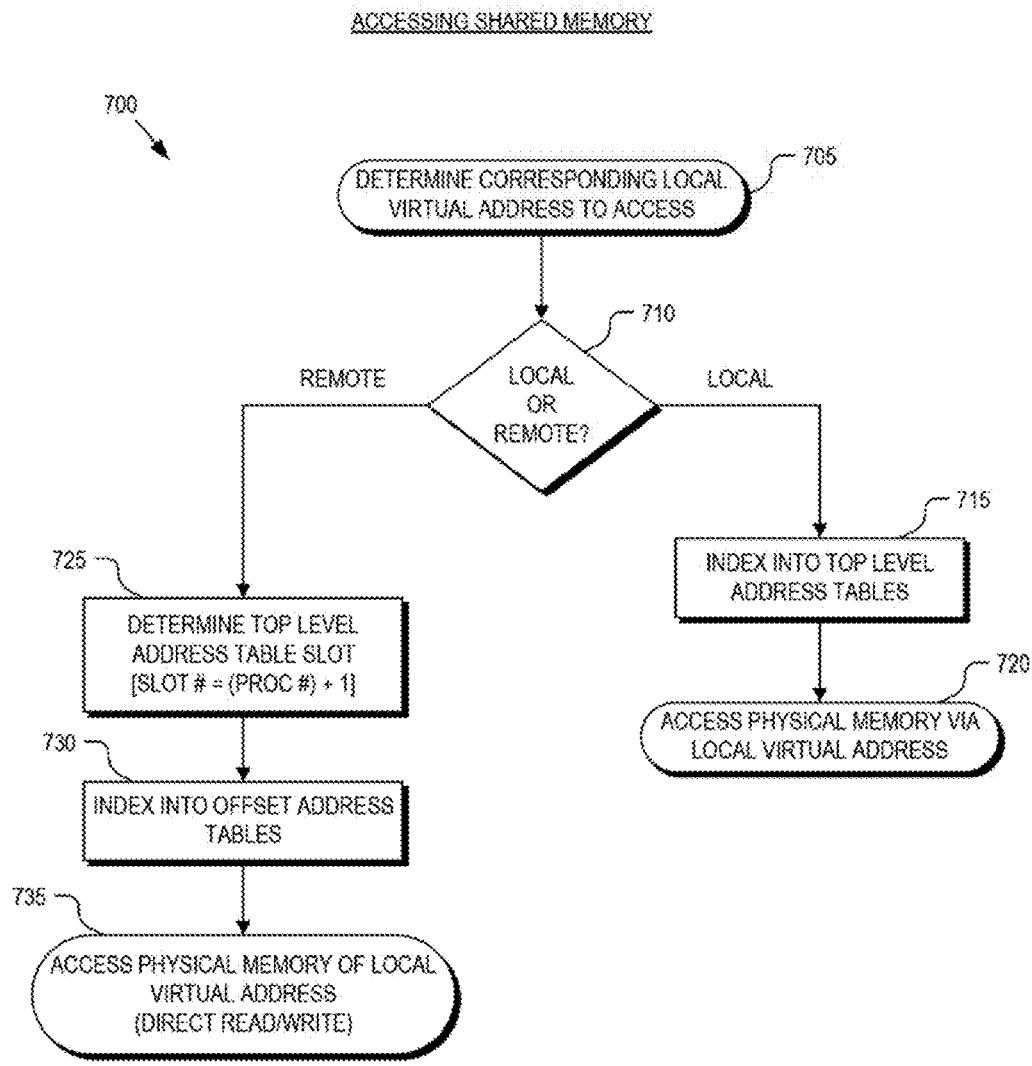
FIG. 7 is a flow chart illustrating a method for directly accessing local physical memory and remote physical memory of another process, in accordance with an embodiment of the invention.

FIG. 7 is a flow chart illustrating a method 700 for directly accessing local physical memory of a given process and remote physical memory of another process, in accordance with an embodiment of the invention. The order in which some or all of the blocks appear in method 700 should not be deemed limiting. Rather, one of ordinary skill in the art having the benefit of the present disclosure will understand that some of the blocks may be executed in a variety of orders not illustrated.

In a block 705, the local virtual address of the data to be access is determined by the given process 230. If the data is located within the local address space of the given process 230 (decision block 710), then method 700 continues to a block 715. In block 715, the process 230 indexes into its own local address space with reference to first entry 320 of its top level virtual address table. Finally, in a block 720, the local virtual address is used to traverse its local virtual address tables (e.g., local page table tree), determine the physical address, and access the data within physical memory 215 at the physical address.

Returning to decision block 710, if the data to be accessed is remotely located in the local address space of another process 230, then method 700 continues from decision block 710 to a block 725. In block 725, the top level offset is calculated for the remote address space of the other process 230. In the embodiment illustrated in FIG. 5, the offset is quickly calculated by adding '1' to the process # or core # to identify the corresponding subsequent entry in the accessing process' top level virtual address table. In a block 730, the remote address space is accessed by indexing into the offset virtual address tables linked via the calculated offset entry in the top level virtual address table of the accessing process 230. Finally, in a block 735, the accessing process 230 directly access the data at the physical address within physical memory 215 using the local virtual address to traverse the lower levels (e.g., levels 1 through 3) of the virtual address tables in the remote address space.

The direct access shared memory approached described herein is compatible with a number of existing technologies including Message Passing Interface ("MPI") point-to-point communication and MPI collective communication. With few changes, these technologies can be implemented using direct access shared memory. For example, MPI point-to-point communication can be modified to enable a single-copy MPI transfer without the overhead of kernel involvement. In embodiments using a fixed, linear mapping of virtual addresses to physical memory, the need to remap page tables on the fly is eliminated. User-level access to shared memory avoids serialization through the kernel. While conventional MPI collective reduction operations can be performed directly in place at a destination buffer, each of the processes involved must first copy their operands into shared memory, the operation is performed, and then the result is copied out. In contrast, direct access shared memory enables a process to directly perform the operation on the buffer of other processes. One-sided operations, such as the MPI-2 remote memory access operations and Cray SHMEM get/put operations can also be implemented using the direct access shared memory approach.

For Cray SHMEM, all functions are defined as weak symbols with a set of shadow functions whose names are prefaced by a 'p'. For example, the library defines shmem_put( ) as a weak symbol and defines pshmem_put( ) as the actual function. This makes it possible for an application to define its own version of the function that in turn calls the underlying library function. This mechanism may be leveraged to implement the SHMEM functions using the direct access shared memory approached described above for intra-node transfers. Logic is added to each SHMEM function to determine whether the destination process of a data transfer/memory access is on-node or off-node. For on-node communications, the virtual address conversion function described in FIG. 7 determines the remote virtual address to use and then perform the appropriate operation. If the destination is off-node, the standard function is used.

The methods explained above are described in terms of computer software and hardware. The techniques described may constitute computer-executable instructions embodied within a machine (e.g., computer) readable storage medium, that when executed by a machine will cause the machine to perform the operations described. Additionally, the methods may be embodied within hardware, such as an application specific integrated circuit ("ASIC") or the like.

A machine-readable storage medium (or computer-readable storage medium) includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of directly sharing physical memory between processes executing on separate processor cores, each of the processes having its own respective top level address table, the method comprising:
   loading a plurality of processes into physical memory for execution on a corresponding plurality of processor cores sharing the physical memory;
   mapping an address space to each of the processes by populating a first entry in the respective top level virtual address table for each of the processes; and
   cross-mapping the address space of each of the processes into each of the other processes by populating one or more subsequent entries of each of the top level virtual address tables with the first entry in the top level virtual address table from other processes.

2. The method of claim 1, further comprising accessing the physical memory by each of the processes with reference to their respective top level virtual address tables,
   wherein each of the processes accesses its own portion of the physical memory within its corresponding address space with reference to the first entry in its corresponding top level virtual address table, and
   wherein each of the processes directly accesses other portions of the physical memory within the address space of other processes executing on other processor cores with reference to subsequent entries in its corresponding top level virtual address table.

3. The method of claim 2, wherein the subsequent entries are determined by calculating offsets into the top level virtual address table, each of the offsets being associated with a different one of the processes executing on a different one of the processor cores.

4. The method of claim 2, wherein accessing the physical memory by each of the processes with reference to their respective top level virtual address tables further comprises:
   selecting data stored within the physical memory to access by a first process executing on a first processor core;
   determining a local virtual address associated with a location of the data stored in the physical memory and mapped to the address space of a second process executing on a second processor core;

determining an offset associated with the second process; and directly accessing the data stored in the address space of the second process by the first process with reference to the local virtual address and the offset.

5. The method of claim 1, wherein cross-mapping the address space of each of the processes into each of the processes by populating the one or more subsequent entries of the top level virtual address table with the first entry in the top level virtual address table from the other processes is executed by a master process executing on a primary core of the processor cores.

6. The method of claim 5, wherein the master process maintains a master list of the first entry in the top level virtual address table of each of the processes.

7. The method of claim 6, wherein the master process comprises a master kernel for execution on the primary core, the method further comprising:

trapping to a secondary kernel executing on a given processor core in response to an interrupted request received by the given processor core;

switching execution contexts to a new execution context having a new address space on the given processor core; and interrupting the primary core via an inter-processes trap handler to update one of the subsequent entries in the top level virtual address table of each of the other processes with a new entry to reflect the new address space associated with the new execution context on the given processor core.

8. The method of claim 1, wherein the address space of each of the processes comprises a fixed, linear mapping of virtual addresses to the physical memory.

9. The method of claim 1, wherein the processes collectively represent a portion of a parallel processing job executing on a single processing node of a massively parallel computer.

10. A non-transitory computer-readable storage medium that provides instructions that, if executed by a computer, will cause the computer to perform operations comprising:

loading a plurality of processes into physical memory for execution on a corresponding plurality of processor cores sharing the physical memory;

mapping an address space to each of the processes by populating a first entry in a respective top level virtual address table for each of the processes, wherein each of the processes has its own respective top level virtual address table; and cross-mapping the address space of each of the processes into each of the other processes by populating one or more subsequent entries of each of the top level virtual address tables with the first entry in the top level virtual address table from other processes.

11. The non-transitory computer-readable storage medium of claim 10, further providing instructions that, if executed by the computer, will cause the computer to perform further operations, comprising:

accessing the physical memory by each of the processes with reference to their respective top level virtual address tables, wherein each of the processes accesses its own portion of the physical memory within its corresponding address space with reference to the first entry in its corresponding top level virtual address table, and wherein each of the processes directly accesses other portions of the physical memory within the address space of other processes executing on other processor cores with reference to subsequent entries in its corresponding top level virtual address table.

12. The non-transitory computer-readable storage medium of claim 11, wherein the subsequent entries are determined by calculating offsets into the top level virtual address table, each of the offsets being associated with a different one of the processes executing on a different one of the processor cores.

13. The non-transitory computer-readable storage medium of claim 10, wherein cross-mapping the address space of each of the processes into each of the processes by populating the one or more subsequent entries of the top level virtual address table with the first entry in the top level virtual address table from the other processes is executed by a master process executing on a primary core of the processor cores.

14. The non-transitory computer-readable storage medium of claim 13, wherein the master process comprises a master kernel for execution on the primary core, the computer-readable storage medium further providing instructions that, if executed by the computer, will cause the computer to perform further operations, comprising:

trapping to a secondary kernel executing on a given processor core in response to an interrupted request received by the given processor core;

switching execution contexts to a new execution context having a new address space on the given processor core; and interrupting the primary core via an inter-processes trap handler to update one of the subsequent entries in the top level virtual address table of each of the other processes with a new entry to reflect the new address space associated with the new execution context on the given processor core.

15. The non-transitory computer-readable storage medium of claim 10, wherein the address space of each of the processes comprises a fixed, linear mapping of virtual addresses to the physical memory.

16. A processing node for executing a portion of a parallel processing job made up of a plurality of processes, each of the processes having its own respective top level address table, the processing node comprising:

a plurality of processors each including two or more processor cores, each of the processor cores for executing one of the processes of the parallel processing job;

a network interface for communicatively coupling the processors to other processing nodes for executing other portions of the parallel processing job; and physical memory coupled to the processors, the physical memory including instructions that, if executed by the processors, will cause the processing node to perform operations, comprising:

mapping address spaces within the physical memory to their respective processes by populating a first slot in the respective top level virtual address table for each of the processes with a pointer to lower level virtual address tables of their respective address spaces; and cross-mapping the local address spaces of each of the processes into each of the other processes by populating one or more subsequent entries of the top level virtual address table associated with each of the processes with pointers in the first slot of each of the top level virtual address tables from other processes such that each top level virtual address table includes pointers for directly accessing the address spaces of the other processes.

17. The processing node of claim 16, wherein the physical memory includes further instructions that, if executed by the processors, will cause the processing node to perform further operations, comprising:
  accessing the physical memory by each of the processes with reference to their respective top level virtual address tables,
  wherein each of the processes accesses its own portion of the physical memory within its corresponding address space with reference to the first entry in its corresponding top level virtual address table, and
  wherein each of the processes directly accesses other portions of the physical memory within the address space of other processes executing on other processor cores with reference to subsequent entries in its corresponding top level virtual address table.

18. The processing node of claim 17, wherein the subsequent entries are determined by calculating offsets into the top level virtual address table, each of the offsets being associated with a different one of the processes executing on a different one of the processor cores.

19. The processing node claim 16, wherein cross-mapping the address space of each of the processes into each of the processes by populating the one or more subsequent entries of the top level virtual address table with the first entry in the top level virtual address table from the other processes is executed by a master process executing on a primary core of the processor cores.

20. The processing node of claim 16, wherein the address space of each of the processes comprises a fixed, linear mapping of virtual addresses to the physical memory.

* * * * *